(12) United States Patent
Steindl

(10) Patent No.: US 9,100,209 B2
(45) Date of Patent: Aug. 4, 2015

(54) METHOD FOR REAL-TIME DATA TRANSMISSION IN A COMMUNICATION NETWORK

(75) Inventor: Günter Steindl, Poppenricht (DE)

(73) Assignee: Siemens Aktiengesellschaft, Munich (DE)

(*) Notice: Subject to any disclaimer, the term of this patent is extended or adjusted under 35 U.S.C. 154(b) by 199 days.

(21) Appl. No.: 13/420,285

(22) Filed: Mar. 14, 2012

(65) Prior Publication Data

US 2012/0236873 A1    Sep. 20, 2012

(30) Foreign Application Priority Data

Mar. 15, 2011    (EP) .................................. 11158176

(51) Int. Cl.
| | | |
|---|---|---|
| H04L 12/40 | (2006.01) | |
| H04L 12/403 | (2006.01) | |
| H04L 12/54 | (2013.01) | |
| H04L 12/64 | (2006.01) | |
| H04J 3/06 | (2006.01) | |
| H04W 72/12 | (2009.01) | |
| H04L 1/18 | (2006.01) | |
| H04L 1/00 | (2006.01) | |
| H04L 12/761 | (2013.01) | |
| H04L 29/06 | (2006.01) | |
| H04W 28/06 | (2009.01) | |
| H04W 88/02 | (2009.01) | |

(52) U.S. Cl.
CPC .... *H04L 12/40013* (2013.01); *H04L 12/40026* (2013.01); *H04L 12/4035* (2013.01)

(58) Field of Classification Search
CPC ......... H04J 3/06; H04J 3/0658; H04J 3/0682; H04L 12/4035

USPC ......... 370/329, 353, 383, 393, 401, 432, 468, 370/503–514, 350, 325, 395.62, 428; 710/106

See application file for complete search history.

(56) References Cited

U.S. PATENT DOCUMENTS

| | | | |
|---|---|---|---|
| 6,959,013 B1 * | 10/2005 | Muller et al. ................. | 370/512 |
| 7,411,966 B2 | 8/2008 | Brückner et al. | |
| 7,460,560 B2 | 12/2008 | Brüuckner et al. | |
| 7,656,865 B2 * | 2/2010 | Brueckner et al. ............ | 370/353 |

(Continued)

FOREIGN PATENT DOCUMENTS

| | | |
|---|---|---|
| CN | 1529967 | 9/2004 |
| CN | 1682504 A | 10/2005 |

(Continued)

*Primary Examiner* — Un C Cho
*Assistant Examiner* — Peian Lou
(74) *Attorney, Agent, or Firm* — Cozen O'Connor

(57) ABSTRACT

A method for real-time data transmission in a communication network for transmitting useful data from a transmitter to a plurality of receivers, wherein the receivers are synchronized in terms of time via a synchronization method, at least one time for transmitting a respective useful data message to the receivers is stipulated during real-time data transmission, each of the receivers is assigned its own receiver useful data area within the useful data message, which area is assigned to the receiver, and the transmitter transmitting a useful data message. In accordance with the invention, a first of the receivers receiving this useful data message, stores the useful data contained in the receiver useful data area assigned to it for further processing, and forwards the useful data message to a second of the receivers at the transmission time.

18 Claims, 5 Drawing Sheets

(56) References Cited

U.S. PATENT DOCUMENTS

| | | |
|---|---|---|
| 7,710,908 B2 | 5/2010 | Larsson et al. |
| 7,953,570 B2 * | 5/2011 | Merlin et al. ............... 702/108 |
| 2002/0064157 A1 | 5/2002 | Krause |
| 2005/0018626 A1 * | 1/2005 | Bruckner et al. ............ 370/324 |
| 2005/0041653 A1 | 2/2005 | Arnold et al. |
| 2006/0018327 A1 | 1/2006 | Brueckner et al. |
| 2006/0161705 A1 | 7/2006 | Schultze et al. |
| 2007/0058682 A1 | 3/2007 | Albrecht et al. |
| 2009/0147738 A1 * | 6/2009 | Larsson et al. ............... 370/329 |
| 2010/0161862 A1 * | 6/2010 | Fredriksson ................ 710/106 |

FOREIGN PATENT DOCUMENTS

| | | |
|---|---|---|
| CN | 1297123 | 1/2007 |
| CN | 101213781 A | 7/2008 |
| CN | 100514891 | 7/2009 |
| DE | 197 21 740 | 11/1998 |
| DE | 100 58 524 | 6/2002 |
| DE | 102 34 149 | 4/2003 |
| EP | 1 675 311 | 6/2006 |
| EP | 1 748 338 | 1/2007 |

* cited by examiner

METHOD FOR REAL-TIME DATA TRANSMISSION IN A COMMUNICATION NETWORK

BACKGROUND OF THE INVENTION

1. Field of the Invention

The present invention relates to network communications and, more particularly, to a method for real-time data transmission in a communication network, i.e., a field bus network, for transmitting useful data from a transmitter to a plurality of receivers.

2. Description of the Related Art

DE 10058524 A1 and DE 10234149 A1 disclose methods for real-time data transmission in an automation network, i.e., an "isochronous real-time fast Ethernet (IRTE)" method, in which real-time data can be cyclically interchanged in the communication system or automation network within an IRT time range via a relatively complex organizational process, is disclosed, inter alia, for example. A disadvantage of such systems is that the organizational effort needed to prepare for communication and/or needed to control the individual messages to the different communication partners during communication is large.

SUMMARY OF THE INVENTION

It is an object of the present invention is to provide a method for real-time data transmission in a communication network, which method enables real-time data transmission with simpler and/or less organizational effort.

This and other objects and advantages are achieved by a method for real-time data transmission data transmission in a communication network, i.e., a field bus network, for transmitting useful data from a transmitter to a plurality of receivers, where the receivers are synchronized in terms of time via a synchronization method, at least one time for transmitting a respective useful data message to the receivers being stipulated during real-time data transmission, where each of the receivers is assigned its own receiver useful data area within the useful data message, and the area is assigned to the receiver. In addition, the transmitter transmits a useful data message, where a first of the receivers receiving this useful data message, stores the useful data contained in the receiver useful data area assigned to it for further processing, and forwards the useful data message to a second of the receivers at the transmission time.

In accordance with the method of the invention, a useful data message is assigned to a plurality of receivers and contains or can contain data for each of these receivers. As a result, the organizational or operating effort for such real-time data transmission can be reduced in comparison with the conventional methods, because message control has to be performed only for one message and a separate message need not be provided for each of the receivers and thus need not be organized and controlled. As a result, it is possible to reduce and simplify the organizational effort and/or the time control effort and possibly also the overall communication effort.

In an embodiment, a communication network is configured as a telecommunication network, a data communication network, a control network or an automation network. In embodiment, the communication network may comprise a field bus communication network and/or an automation communication network. In other embodiments, the field bus communication network or field bus network is generally configured for communication between a control unit, an automation controller, or a comparable unit and corresponding sensors and/or actuators of a system to be controlled. IN still further embodiments, these field bus networks are configured in accordance with the "Profinet", "Controller Area Network (CAN)", "Profibus", "Modbus" or a comparable standard.

In accordance with the disclosed embodiments, the real-time data transmission may be, for example, a data transmission method which is configured for coordinated communication between time-synchronized partners. In particular, a defined transmission time or a certain transmission period may be stipulated, guaranteed and/or predefined during real-time data transmission. In the field bus or automation sector, such real-time data transmission methods may be implemented and/or set up, for example, as "Profinet IRT", "EtherCAT", "SERCOS III", "ETHERNET Powerlink", "Modbus/TCP", "Profinet IO", "Ethernet/IP" or a similar real-time data transmission method.

In accordance with the disclosed embodiments, the transmitter and the receivers may each comprise any desired subscribers of a communication network, i.e., a field bus network. In one embodiment, the transmitter and the receivers are configured and set up as an automation control unit, a switching unit, for example, in a distributed automation network, a module of a modular control device, a corresponding machine to be controlled or a corresponding device to be controlled, a sensor, a drive or an actuator, or else any desired combination thereof. In one particular embodiment, the transmitter is configured and set up, for example, as a control unit or a control switching unit or, for example, as a field bus controller (e.g., an "IO controller" in the "Profinet IO" or "Profinet IRT" method). In another embodiment, the receivers are configured, for example, as a field bus device (e.g., an "IO device" in the "Profinet IO" or "Profinet IRT" method), or comparable modules or devices in the field bus and/or automation network.

The method for real-time data transmission in accordance with the disclosed embodiment is implemented and set up to transmit useful data to at least two or else more receivers, such as more than 3, 5 or 10 receivers.

The synchronization method for synchronizing the receivers in terms of time can be performed, for example, in accordance with one of the conventional time synchronization methods. Such methods can be designed and configured, for example, in accordance with the "Precision Transparent Clock Protocol (PTCP)" as per International Electrotechnical Commission (IEC) standard 611558 or the "Precision Time Protocol (PTP)" as per Institute of Electrical and Electronics Engineers (IEEE) standard 1588 or a comparable method. Here, the time synchronization can be controlled and organized by the transmitter and/or at least one of the receivers. In this case, at least one of the components may be used, for example, as a "master" for the time synchronization, for example.

In certain embodiments, a transmission time is defined, for example, as an absolutely or relatively stipulated time. In the case of a plurality of devices, all of the devices may have the same time that is defined on an absolute scale, for example. Furthermore, a transmission time in different devices may be respectively at a different time on an absolute time scale, the time differences being able to be given, for example, by message propagation times or processing times.

In other embodiments, the transmission time is also defined or may be defined as a corresponding time as described above, including an accuracy or tolerance period of time. Such an accuracy or tolerance period of time may be technically determined, for example, by propagation times and/or accuracies of individual components, the overall device, or a plurality of devices. For example, such an accuracy period for a transmission time may be less than or equal to one microsecond, 10 microseconds, 100 microseconds, or less than or equal to 1 millisecond, 10 milliseconds or 100 milliseconds. In the case of the abovementioned "Profinet IO in accordance with the IRT method", for example, such a tolerance period of time or accuracy of the transmission time is less than or equal to one microsecond.

One or more transmission times may be stipulated. In the case of a plurality of transmission times, each time can be newly stipulated in a flexible manner. Furthermore, a plurality of transmission times may also be stipulated and agreed in advance. In particular, a plurality of transmission times may follow one another at previously stipulated irregular or regular or periodic intervals of time.

At the transmission time or at each of the transmission times, a useful data message can or is then transmitted to the receivers, with one useful data message being addressed to each of the plurality of receivers. In this case, provision may be made for a useful data message to be actually transmitted at a particular transmission time only when there are corresponding data for at least one of the receivers. Otherwise, a useful data message is not transmitted at this transmission time.

The transmission times may be stipulated, for example, before real-time data transmission begins. For this purpose, the transmission times may be planned in a planning system, for example. Here, it is possible to stipulate, for example, the transmission time at which or the regularly or irregularly successive transmission times at which a message is respectively transmitted to the plurality of receivers.

Such an item of information relating to the transmission time(s) can be communicated, for example, before real-time data transmission begins or within an item of update information during real-time data transmission in the communication or field bus network. This information may be communicated to the communication partners in the communication network or field bus network, for example, within one or more corresponding information or planning messages. Such an information or planning message may furthermore also comprise, for example, information relating to the receivers of the useful data message or a sequence for forwarding or transmitting the useful data message to the different receivers. The information or planning messages may likewise be communicated, for example, during real-time data transmission or else during non-real-time data transmission.

Within the disclosed embodiments of the method for real-time data transmission, a message, i.e., precisely one message, is transmitted to the plurality of receivers, i.e., at each transmission time. Here, the useful data message may be designed and configured, for example, as an Ethernet message, i.e., an Ethernet frame or part of an Ethernet frame.

In another embodiment, a receiver useful data area assigned to a particular receiver may be, for example, a particular, permanently predefined data area within the useful data message. This data area can be communicated to the respective receiver, for example, as preparation for real-time data transmission. As a result, each receiver finds out which area within a real-time message contains or can contain the data assigned to it during preparation for real-time data transmission or during a corresponding update.

In this case, the signaling to the receivers may be performed, for example, such that a receiver is informed of the area of a particular real-time message in which data intended for it can be found. Furthermore, all other areas of this message or all other useful data areas in this message may also be configured as "gaps" for this receiver, for example. Such signaling or definition of the useful data areas may be defined and/or organized, for example, during Profinet communication.

In accordance with the disclosed embodiments, a provision is also made for a receiver to also recognize the useful data area assigned to it using a special identifier, for example.

In general, provision may be made for a useful data area within the useful data message to be allocated to each of the receivers irrespective of whether there are actually useful data for this receiver at each of the transmission times.

In another embodiment, provision may also be made for a useful data message to comprise useful data for each of the plurality of receivers. Furthermore, provision may be made for only useful data for some or one of the plurality of receivers or for no useful data (e.g., when there are no data to be transmitted at the transmission time) to be contained in a useful data message.

The wording stating that the first of the receivers or a further one of the receivers stores the useful data assigned to it also includes the situation in which no useful data are included for it, and the receiver accordingly also does not store or does not have to store anything, or stores only dummy information.

The useful data message is forwarded to the second of the receivers, i.e., at the transmission time including a tolerance time (already described above) which may be technically related, device-related or else adjustable.

Furthermore, provision may also be made for a period of time before the transmission time, within which reception, transmission and/or forwarding of the useful data message are likewise considered to be reception, transmission and/or forwarding at the transmission time, to also be allocated to the transmission time as an additional tolerance period of time. As a result, it is possible to simplify the real-time data transmission method further, for example, because lower technical demands have to be imposed on corresponding equipment for real-time communication in this manner, for example.

Apart from forwarding to the second of the receivers, forwarding may additionally also be performed to further ones of the receivers in a parallel manner. Moreover, the message can be forwarded in such a manner that the message is forwarded without change. Alternatively, the message may also undergo corresponding changes, for example, the message may receive a new addressee, may receive a new sender and/or may also undergo a change or deletion of the stored useful data and/or further changes.

The useful data message may be forwarded from the first of the receivers to the second of the receivers and optionally to further ones of the receivers, for example, in a previously stipulated order. This order may have been stipulated or may be stipulated, for example, as a result of planning and/or as a result of fixed cabling. For example, the order in which the useful data message is forwarded to the receivers may have been previously stipulated as a result of planning, each of the receivers being informed, for example, of the further receiver to which it is intended to forward a message which arrives at the receiver at a particular transmission time. As a result, it becomes possible to firmly plan a forwarding chain, which enables particularly simple and rapid forwarding of the messages. The recognition of a particular message or the assignment to a particular forwarding port may be performed, for example, based on the arrival at a particular transmission time or within a tolerance period of time assigned to the latter in accordance with disclosed embodiments of the invention and/or also based on a message identifier, a sender, an address, an ID or the like.

The above-described embodiments of the method in accordance with the invention also has the advantage that the transmitter need not necessarily be synchronized in time with the receivers, but rather, for example, a message can also be transmitted to the receivers at any desired time, for example, if the abovementioned tolerance period of time is selected to be correspondingly long for reception of the message. The method in accordance with the invention results in the first of the receivers then forwarding this useful data message, for example, at the next transmission time, for example, with a considerably tighter tolerance period of time, and thus virtually "synchronizing" the message into the real-time scheme.

As a result, it is possible to forward a useful data message at least between the receivers "in real-time" without the transmitter technically having to be suitable at all for real-time transmission. For example, provision may be made, in this respect, for the transmitter to transmit a useful data message within an accordingly safe temporal lead before the next transmission time. This method can then nevertheless result in at least the receivers, such as actuators and/or sensors of a system or machine to be controlled, nevertheless being driven in real-time in a manner synchronized in terms of time relative to one another. As a result, it is possible to further simplify the method for real-time transmission because the technical demands imposed on the transmitting unit, for example, can be reduced.

In one advantageous embodiment, the transmitter may also be synchronized in terms of time with the receivers, the transmitter being able to transmit the useful data message, for example, at the transmission time, including possible tolerance times, and/or within a period of time assigned to real-time transmission. Here, the time synchronization may again be performed, for example, in accordance with one of the time synchronization methods explained in the present description. Here, the time synchronization may also be organized, for example, by at least one of the receivers or by the transmitter (i.e., the respective unit is the "master" for the time synchronization).

The period of time assigned to real-time transmission may correspond, for example, to the transmission time, possibly including a tolerance time which has already been explained in the present description. Furthermore, the period of time assigned to real-time transmission may be a corresponding period of time before the transmission time and the corresponding tolerance time.

IN certain embodiments, the tolerance periods of time assigned to the transmission time are different in the transmitter and the receivers. For example, tolerance periods of time may thus be longer in the transmitter than in the receivers. As a result, it is possible, for example, for the transmitter to transmit the useful data message with a "more relaxed" temporal lead before the actual transmission time and for the message to then nevertheless be "synchronized" into the correct forwarding scheme at the transmission time in accordance with the disclosed embodiments of the present invention with accordingly short tolerance times via the first of the receivers, for example. As a result, it becomes possible for the transmitter, for example, to indeed operate in a time-synchronized manner and to also transmit its data during real-time data transmission but nevertheless to satisfy technically lower demands, for example. Accordingly, it is thus possible to transmit data using the described method with simpler means and therefore also in a simpler manner.

Additionally, the period of time assigned to the real-time transmission may also be provided around the transmission time or after the transmission time, optionally including possible tolerance times.

In one advantageous embodiment, each of the receivers can receive the useful data message, can store the useful data contained in the receiver useful data area assigned to it for further processing, and can optionally forward the useful data message to a further one of the receivers.

The order in which the useful data message is received by the receivers can be effected in the manner as already explained, for example, in accordance with the disclosed embodiments of the present invention. For example, this order may thus be accordingly permanently predefined as a result of planning and/or as a result of cabling, for example. Furthermore, as preparation for real-time data transmission or within a corresponding update, each of the receivers may receive an item of information relating to whom it is intended to forward a particular real-time useful data message, such as defined by a particular transmission time, for example, at which of its ports the receiver is intended to output this message.

Provision can also be made here for a receiver either to store nothing or to accordingly store an item of dummy information if the receiver useful data area assigned to the receiver does not contain any useful data for the receiver. In addition, provision may be made for a receiver not to forward the message when no further receiver is intended and/or planned to receive the useful data message.

In other embodiments, the useful data message is forwarded to a plurality of receivers in a parallel manner.

In yet a further embodiment, at least one of the receivers, the first receiver or all of the receivers compare a time at which it/they receive(s) the useful data message with the at least one transmission time and, based on the result of this comparison, store the useful data contained in the receiver useful data area assigned to it/them for further processing. As a This makes it possible to provide, for example, for the receiver to recognize a particular useful data message from the fact that the message arrives at the receiver at the transmission time or in a corresponding tolerance period assigned to the transmission time.

Provision may thus be made for the receiver or receivers to store the useful data stored in that useful data area of the useful data message which is assigned to it/them when the difference between the reception time and the transmission time is within a particular predefined period of time which may correspond, for example, to the tolerance time explained in the present description. Propagation times and/or internal processing times may furthermore also be taken into account when comparing the reception time with the transmission time.

The presently contemplated embodiment has the advantage that a particular useful data message or a particular useful data message cycle can be identified using the reception time in a receiver and previously communicated transmission times and is then assigned to a particular real-time transmission scheme, for example.

If a corresponding real-time scheme is defined, for example, by a sequence of transmission times, for example, a periodic or an aperiodic sequence, the comparison of the reception time with the transmission time is advantageously effected with the next transmission time within this sequence and possibly also with the last preceding transmission time. If the reception time is then within the predefined tolerance range around the transmission time and/or is before the corresponding transmission time, the useful data message is assigned to the defined real-time transmission scheme and the included information is accordingly processed and forwarded. If the reception time is outside such a time range, the useful data message is treated according to another transmission or communication scheme or is rejected, for example.

In another embodiment, the first receiver to compares a time at which it receives a useful data message with the at least one transmission time and, based on the result of this comparison, stores the useful data contained in the receiver useful data area assigned to it for further processing, and forwards the useful data message to the second of the receivers at the transmission time.

Here, the first receiver may be configured, for example, such that useful data messages within a relatively long tolerance period around the transmission time and/or before the transmission time are recognized as belonging to the real-time transmission method within the comparison operation and are then, however, forwarded to the second of the receivers at the transmission time, for example, including a tolerance time which is then shorter. As a result, it is possible for the first receiver to "synchronize" a useful data message transmitted, for example, with a certain lead with respect to the transmission time into the actual transmission time cycle and thus to achieve correct and accurate real-time transmission within the receiver chain.

A first receiver configured in this manner is also able, for example, to correctly process a useful data message during real-time transmission from transmitters that have lower technical capabilities and are therefore not able to comply with a very precise transmission time or an accordingly restrictive transmission time tolerance.

In other embodiments, a plurality of the receivers or all of the receivers to is configured in the manner explained above with respect to the first receiver. The receivers can then thus recognize, for example, useful data messages, which arrive at the receiver at the transmission time and in a corresponding tolerance time, as well as those messages which arrive at the receiver within a corresponding temporal lead before the transmission time, as belonging to a particular real-time transmission scheme, can accordingly remove useful data intended for the respective receiver from the message and can forward the useful data message, for example, in accordance with a predefined forwarding scheme (e.g., at a particular intended port) at the transmission time or within the corresponding tolerance time.

In other embodiments, a plurality of times for transmitting useful data messages to the receivers is provided, and the transmission times follow one another at regular intervals of time. As a result, a real-time transmission scheme becomes defined in which real-time messages can be forwarded to receivers at regular intervals of time with predefined tolerance times, i.e., with restrictive tolerance times, and thus accurately coordinated control is achieved by a plurality of receivers that may comprise device such as actuators or sensors. Such a transmission scheme may be configured, for example, according to real-time protocols, for example, Profinet IO according to the IRT method, Ethernet/IP, Modbus/TCP, Ethernet Powerlink, Sercos III and/or EtherCAT.

Furthermore, at least one preparation message may be provided or transmitted to the receivers for the purpose of setting up real-time data transmission, the at least one preparation message comprising an item of information relating to the at least one time for transmitting the useful data message or messages, and/or information relating to at least one of the receiver useful data areas of the respective receivers and/or information relating to one or more receivers to which a corresponding useful data message should be forwarded.

In particular, the preparation message may also contain an item of information relating to a tolerance period of time that is respectively assigned to the transmission time or times, and within which an arriving message is still recognized as a useful data message during real-time data transmission according to the present description.

Such a preparation message, which can be created, for example, by the transmitter, one of the receivers or a corresponding planning unit, makes it possible to convey information needed for real-time transmission, for example, to the transmitter and to the receivers. Such an item of information can be transmitted, for example, for the purpose of setting up real-time transmission or for the purpose of updating the information for real-time transmission. Here, one preparation message or a plurality of preparation messages may be provided. One or more such preparation messages may be configured and set up, for example, in accordance with the Profinet standard for setting up real-time communication (e.g., IRT).

The information relating to the at least one transmission time may define, for example, the time, a plurality of times or a particular time scheme. Here, such a time scheme may comprise, for example, the regular sequence of transmission times or may contain corresponding parameters for calculating such times.

The information relating to the at least one of the receiver useful data areas for the respective receiver may contain, for example, an item of information relating to the part of the useful data message that contains the receiver useful data area, i.e., the point at which the useful data area begins and the point at which the useful data area ends or the point at which the useful data area begins and the length of the area. Furthermore, the information relating to the at least one of the receiver useful data areas may be configured such that it contains information stating that the described receiver useful data area contains data for the receiver and otherwise there are only gaps inside the useful data message.

Provision may also be made for the time synchronization to be controlled by one of the receivers. The time synchronization is advantageously generally controlled by a unit which has the highest technical time accuracy within a particular system or belongs to the group of devices which have the technically highest time accuracies. In the present case, the system can then be set up such that the high technical demands with respect to the time accuracy do not have to be imposed on the transmitter and the transmitter can be operated, for example, using standard Ethernet hardware or corresponding other standard communication hardware. The accuracy required for the technical synchronization or the real-time operation of the receivers is only required in the receivers. Here, the receivers in such a system have a higher technical time accuracy than the transmitter. As a result, the time synchronization can also be advantageously undertaken by one of the receivers which can then also accordingly synchronize the transmitter in terms of time, for example.

Provision may also be made for each of the at least one transmission times to be assigned a real-time time range that is provided for real-time data transmission, data communication which is not real-time data transmission furthermore being performed only outside this at least one real-time time range. As a result, it is possible, for example, to organize a transmission scheme in which both real-time transmission and non-real-time transmission can be performed in a parallel manner. In such a scheme, a transmission time according to the present description would then be within such a real-time time range. Each real-time time range may advantageously contain only precisely one transmission time, for example. Furthermore, each real-time time range may advantageously have precisely one transmission time.

The object in accordance with the disclosed embodiments is also achieved by a transmitter for use in a communication network, i.e., a field bus network, for transmitting useful data to a plurality of receivers, where the receivers are synchronized in terms of time via a synchronization method, and the transmitter comprises a control device that is configured and set up to transmit at least one useful data message in accordance with the disclosed embodiments of the for real-time data transmission in accordance with the invention. In this case, the transmitter, the communication network, the field bus network, the receivers, the time synchronization, the useful data message and the transmission may be configured in accordance with the disclosed embodiments of the invention. In particular, the time synchronization may be controlled by the transmitter or by at least one of the receivers, for example. Furthermore, provision may also be made for the transmitter not to be synchronized in terms of time with the receiver.

As a result of the fact that one useful data message is intended for a plurality of receivers, it is possible to provide a real-time data transmission method between the receivers, in which method a smaller amount of organizational and synchronization effort is required in comparison with the conventional methods, because a separate real-time message no longer needs to be transmitted for each receiver at a respective precisely defined time, for example.

However, the transmitter may also be synchronized in terms of time with the receivers via a synchronization method. In this case, provision may be made, for example, for the transmitter to transmit the useful data message within a period of time assigned to real-time data transmission. In particular, provision may be made for the transmitter to transmit the useful data message within a predefined period of time before the transmission time. As a result, it is possible for the transmitter, for example, to have to satisfy lower accuracy demands imposed on possible transmission times than the receivers, for example, and thus also makes it possible for the transmitter to be provided with standard hardware, for example, even if corresponding special hardware is required in the receivers, for example, in order to obtain necessary time accuracy for real-time data transmission and/or corresponding synchronicity (e.g., in the case of a plurality of cooperating motors or drives).

Provision may also be made for the transmitter to transmit the useful data message at the transmission time, optionally taking into account a corresponding tolerance time, such as a technically related tolerance time. Such a method can be provided, for example, in a system in which the transmitter and receivers satisfy the same hardware requirements needed for correct real-time data transmission. In this case, a tolerance time for the transmission time, for example, may then be the same or substantially the same in the transmitter and the receivers.

In addition, the transmitter, which may comprise a communication controller, for example, may be configured and set up to transmit one or more preparation messages to the receivers for the purpose of setting up or updating real-time data transmission. Here, the one or more preparation messages comprises an item of information relating to the at least one time for transmitting the useful data messages, information relating to at least one of the receiver useful data areas for the respective receivers, information relating to forwarding of the corresponding useful data messages, and/or information relating to a tolerance period for the transmission times, within which, upon the reception of a message, where the latter is recognized as a useful data message in accordance with the disclosed embodiments of the present invention.

In particular, the one or more preparation messages may be configured in accordance with the disclosed embodiments of the method of the invention.

The above object is also achieved by a receiver for use in a communication network, i.e., a field bus network, for receiving useful data from a transmitter and for forwarding the useful data to a further receiver, where the receivers are synchronized in terms of time via a synchronization method. In accordance with the presently contemplated embodiment, the receiver comprises a control and memory device that is configured and set up to receive, process and forward at least one useful data message from the transmitter or another one of the receivers according to a method for real-time data transmission according to the present description. Here, the receivers, the transmitter, the communication network, the field bus network, the useful data message, the synchronization method for time synchronization and the processing and forwarding of the at least one useful data message can also be configured and set up in accordance with the disclosed embodiments of the method of the invention.

Such a receiver likewise enables simpler real-time communication, because the receiver is able to forward real-time information to one or more receivers using a single message and is thus able to implement synchronized real-time communication with reduced organizational and synchronization effort. Here, the receiver or the control and memory device of the receiver may be configured and set up to receive the useful data message from the transmitter, store the useful data contained in the receiver useful data area assigned to it, and forward the useful data message to a further one of the receivers at the transmission time.

In this manner, the receiver can recognize either a data packet arriving at the transmission time, possibly including a corresponding tolerance time, a data packet arriving with a corresponding lead before the transmission time, or even a data packet arriving in an unsynchronized manner before the transmission time, as belonging to real-time data transmission in the above described manner and can forward the data packet at the transmission time, i.e., the received can virtually "synchronize" the data packet into the correct real-time rhythm. Processing in this manner enables very flexible use of such receivers in a communication network, i.e., in an automation or field bus network. In this case, the reception as well as the recognition of the useful data message, the storage of the useful data contained therein and the forwarding of the useful data message to a further one of the receivers at the transmission time can be configured and set up in accordance with the disclosed embodiments of the method of the present invention.

In other embodiments, the control and memory device or the receiver comprise a comparison device for comparing a time at which the receiver receives the useful data message with the at least one transmission time, where the control and memory device or the receiver is also configured to store the useful data contained in the receiver useful data area assigned to it based on the result of this comparison. Here, the comparison device may be configured such that the useful data message can be recognized, for example, from the fact that the reception time with respect to the transmission time is effected in the range of a tolerance time for the transmission time or is effected within a defined lead with respect to the transmission time. In the case of a plurality of transmission times, the next transmission time following reception and/or the last preceding transmission time may be used for the comparison, for example. Here, the comparison or the comparison device may also be configured or set-up in accordance with the disclosed embodiments of the method of the invention.

If the useful data message is then accordingly recognized as a particular real-time message, the receiver knows, for example, the area inside the useful data message which contains or may contain information for this receiver and optionally stores this information, if present. If a useful data message does not contain any information for this receiver, nothing is stored or an item of dummy information is stored.

Provision may also be made for the useful data message to be forwarded to a further one of the receivers, if provided, on the basis of the result of said comparison. In this case, provision may be made, in particular, for the useful data message to be forwarded to the further receiver at the transmission time if the comparison reveals that this useful data message is assigned to real-time data transmission at the transmission time.

Such a comparison device enables a simple, efficient and very flexible communication scheme for real-time data transmission since both useful data messages arriving according to the stipulated real-time transmission scheme (including possible tolerance times) and messages arriving with a certain larger tolerance range can be correctly recognized via this refinement of the comparison device and can also be forwarded at the transmission time in accordance with the correct real-time data transmission method. This enables a combination of transmitters and receivers with different hardware properties, i.e., a combination of a transmitter having relatively low accuracy demands with receivers which satisfy high demands in terms of time and synchronization accuracy.

In alternative embodiments, the receiver comprises a time synchronization control unit which is set up and configured to synchronize the receivers or the receivers and the transmitter in terms of time. In this manner, a receiver that satisfies high technical demands in terms of accuracy and synchronization can be used to synchronize in terms of time a system comprising transmitters and receivers in which not all components, for example, not the transmitter and/or else individual ones of the receivers, satisfy the same high technical demands in terms of time accuracy and precision.

In accordance with the disclosed embodiments of the invention, the designations "transmitter" and "receiver" each relate to the transmission of the useful data message in accordance with the disclosed embodiments of the method of the invention. Here, this useful data message comes from the transmitter and is received and optionally forwarded by the receivers. It should be appreciated that during real-time transmission and also during general communication, devices comprising "transmitters" and "receivers" in accordance with the disclosed embodiments of the invention may also assume the respective reverse role. That is, a receiver device can also act as a transmitter for a useful data message at another time or transmission time, for example, and the transmitter may also act as a receiver or one of the receivers, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below, by way of example, with reference to the accompanying figures, in which.

DETAILED DESCRIPTION OF THE PREFERRED EMBODIMENTS

Figure 1:
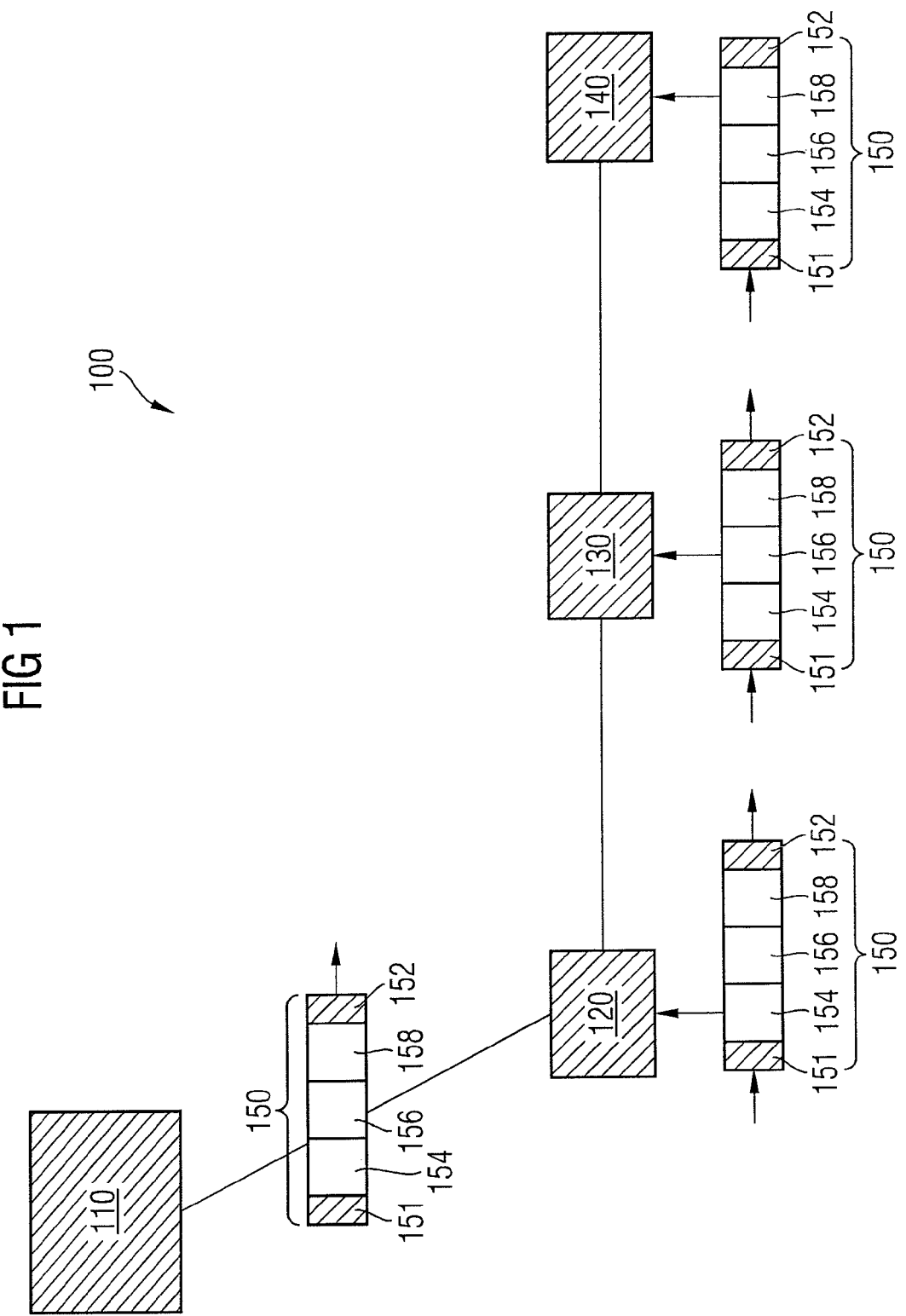
FIG. 1 shows an exemplary block diagram of field bus network.

FIG. 1 shows a communication network 100 which comprises a field bus 100 in accordance with the Profinet standard and within which Profinet IO is used for real-time and non-real-time communication. The following description relates to the use of the Profinet standard but can be analogously simply applied, for example, to further field bus standards, i.e., field bus standards with real-time capability, for example, Ethernet/IP, Modbus/TCP, Ethernet Powerlink, Sercos III or EtherCAT. The Profinet IO used in the field bus network 100 also has in this case, inter alia, communication in accordance with the "Isochronous Real Time (IRT)" method.

With specific reference to FIG. 1, the field bus network 100 comprises an IO controller 110, which is an example of a transmitter in accordance with the disclosed embodiments, and three IO devices 120, 130, 140 which are examples of receivers in accordance with the disclosed embodiments. The IO controller 110 and the IO devices 120, 130, 140 are connected to form a series via corresponding Ethernet lines. A real-time transmission method, in which, for example, a real-time message 150 is passed from the IO controller 110 to the first IO device 120 at a predefined transmission time and is passed from the first device on to the second IO device 130 and then to the third IO device 140, is implemented in the field bus network 100.

Both the controller 110 and the IO devices 120, 130, 140 are synchronized in terms of time, for example, in accordance with the "Precision Transparent Clock Protocol (PTCP)" as per IEC standard 61158. Here, the first IO device 120 acts as the clock master for this time synchronization.

The technical configuration of the controller 110 and of the devices 120, 130, 140 meets all the high demands for isochronous real-time transmission, with the result that the controller 110 transmits the real-time message 150 at a stipulated transmission time. Here, the real-time message 150 comprises an Ethernet header 152, a first data area 154, which is reserved for the first IO device 120 and may contain data for this device, a second data area 156, which is reserved for the second IO device and may contain data for this device, and a third data area 158, which is reserved for the third 10 device 140 and may contain data for this device, as well as an Ethernet trailer 151.

The first IO device 120 receives the message 150 at the transmission time or in the vicinity of the transmission time defined for real-time transmission. As a result of this reception time, the first device 120 recognizes that this is a particular predefined real-time message 150 which firstly may contain useful data for the first device 120 in the data area 154 likewise previously communicated to the first device 120, secondly should be forwarded to the second IO device 130, and thirdly should be forwarded to the second IO device 130 at the transmission time. The first device 120 then stores the data present in the first area 154 of the real-time message 150 and transmits the real-time message 150 on to the second IO device 130 at the transmission time.

The time synchronization method ensures in this case that corresponding propagation and processing times within the devices are taken into account in the time synchronization in such a manner that it is possible for each of the transmitters or receivers to respectively always transmit messages at the transmission time.

The arrival time of the real-time message 150, which is an example of a useful data message in accordance with the disclosed embodiments, is again used in the second IO device 130 to identify this message as a real-time message that should be forwarded at the transmission time and may contain useful data for the second 10 device in the second data area 156. After these data have been stored, the real-time message 150 is then forwarded to the third IO device at the transmission time. At this location, the real-time message 150 is processed in a manner corresponding to that in the other IO devices 120, 130, with the result that information stored in the third data area 158 is stored in the third IO device 140. However, the real-time message 150 is no longer forwarded by the third IO device 140 because there are no further receivers in the field bus network 100. Consequently, when planning communication, the third 10 device 140 also did not receive a corresponding forwarding path or port, for example.

The disclosed embodiments of the method as described makes it possible to supply a plurality of IO devices 120, 130, 140 with real-time communication data with high real-time quality with the uses of only a single message 150. Since only one message 150 has to be transmitted in this case, the demands imposed on the hardware contained in the devices may possibly be lower than if the transmitter 110 was required to send an individual real-time message for each of the receivers 120, 130, 140 at a different but precisely defined time in each case and the first and second IO devices 120, 130, for example, then also had to still forward these messages, some of which are not even intended for them, in real-time.

Figure 2:
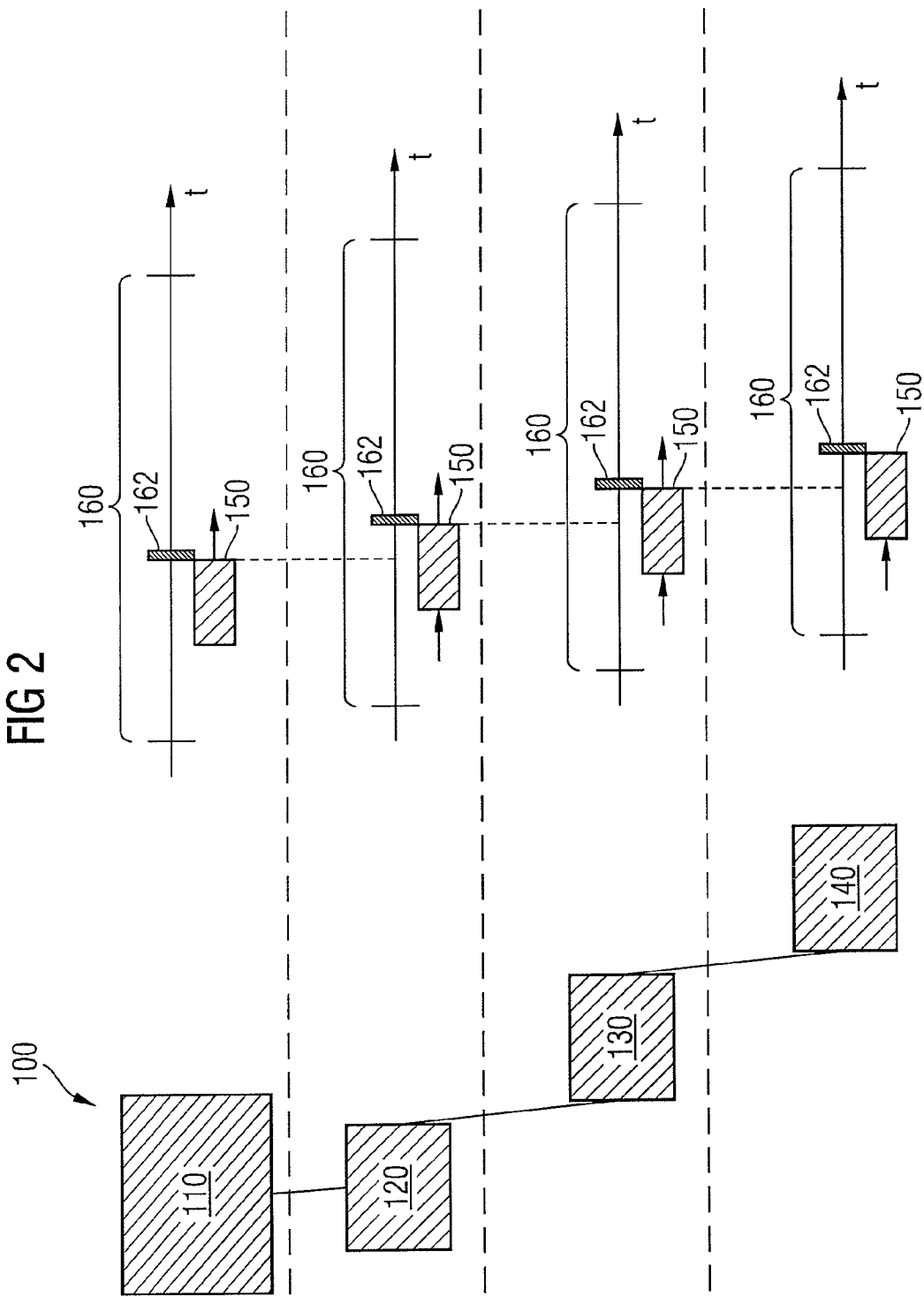
FIG. 2 shows a time plot of a first message time scheme within the field bus network of FIG. 1.

FIG. 2 shows a timing plot of a time scheme for the field bus network 100 illustrated in FIG. 1, where the left-hand part of the drawing respectively illustrates the controller 110 and the devices 120, 130, 140 and the respective right-hand section illustrating a time sequence assigned to the respective device. This time sequence comprises a period of time 160 which is assigned to real-time transmission and within which a transmission time 162 for the real-time transmission of the predefined real-time message 150 is defined. Here, the leading edge of the real-time message 150 in FIG. 2 corresponds to the transmission time of the message in the respective device 110, 120, 130, 140 illustrated on the left.

As illustrated in FIG. 2, the time synchronization results in the transmission times in the different devices 110, 120, 130, 140 being temporally offset, as seen on an absolute time scale, where the temporal offset corresponds to an internal processing and propagation time and to propagation times over connecting lines. As a result, the real-time message 150 transmitted by the controller 110 at the transmission time 162 can again be forwarded by the first IO device 120 at the transmission time 162 despite propagation times and processing times. A corresponding offset then also results in correct forwarding to the second and third IO devices 130, 140. This offset can be achieved, for example, by clocks in the individual devices which already accordingly run with a temporal offset or by synchronous clocks but corresponding correction values when calculating times.

The description of FIGS. 1 and 2 refer in each case to a real-time message 150, a transmission time 162 and a real-time transmission period of time 160. The transmission schemes illustrated can be extended, for example, to periodically repeating real-time transmission periods 160, transmission times 162 respectively contained therein and real-time messages 150 respectively transmitted in the process, as provided for in the Profinet standard or similar standards, for example.

In FIG. 2, the transmission time 162 is illustrated as a rectangle, where the width of the rectangle in the time direction corresponds to a period that corresponds to the transmission time within the scope of the technical properties of the device, i.e., its accuracy in principle.

Figure 3:
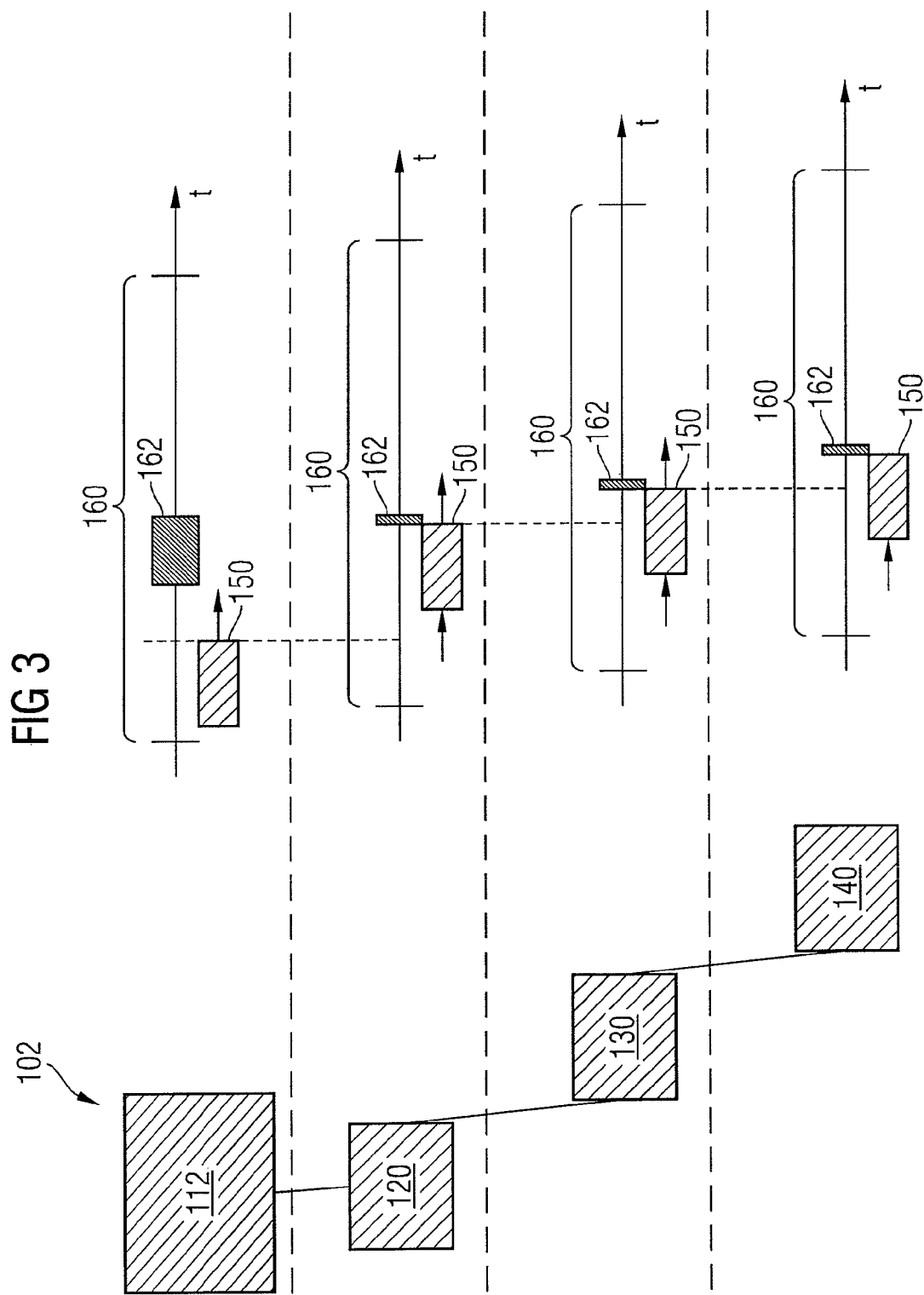
FIG. 3 shows a time plot of a second time scheme for an automation network with an alternative controller in accordance with the invention.

FIG. 3 shows the time scheme from FIG. 2 in a slightly altered field bus network 102, the controller 110 from FIG. 2 having been replaced with a second controller 112 which has technically simpler communication hardware and thus also has poorer transmission accuracy. This is illustrated in FIG. 3 as a broader transmission time 162. Within the scope of the technical accuracy of the second controller 112, the real-time message 150 can thus be transmitted only with an inaccuracy which corresponds to the width of the rectangle assigned to the transmission time 162 in FIG. 3.

In order to nevertheless transmit the real-time message 150 such that the message is accordingly received in the IO devices 120, 130, 140 in a synchronized manner, the real-time message 150 is transmitted by the second controller 112 with a temporal lead illustrated in FIG. 3. During preparation for communication, the IO devices 120, 130, 140 also received the information stating that messages which arrive between the transmission time and the beginning of the real-time data transmission interval 160 should also be assigned to the defined real-time transmission, that these messages, if they arrive before the transmission time, should be stored until the transmission time 162 and should only then be processed and forwarded. Despite the real-time message 150 being transmitted early, this results in the information contained in the message being synchronously processed in the devices 120, 130, 140, with the result that the controlled devices 120, 130, 140 also continue to operate synchronously. The first IO device 120 then virtually synchronizes the real-time message 150 into the correct real-time scheme.

Figure 4:
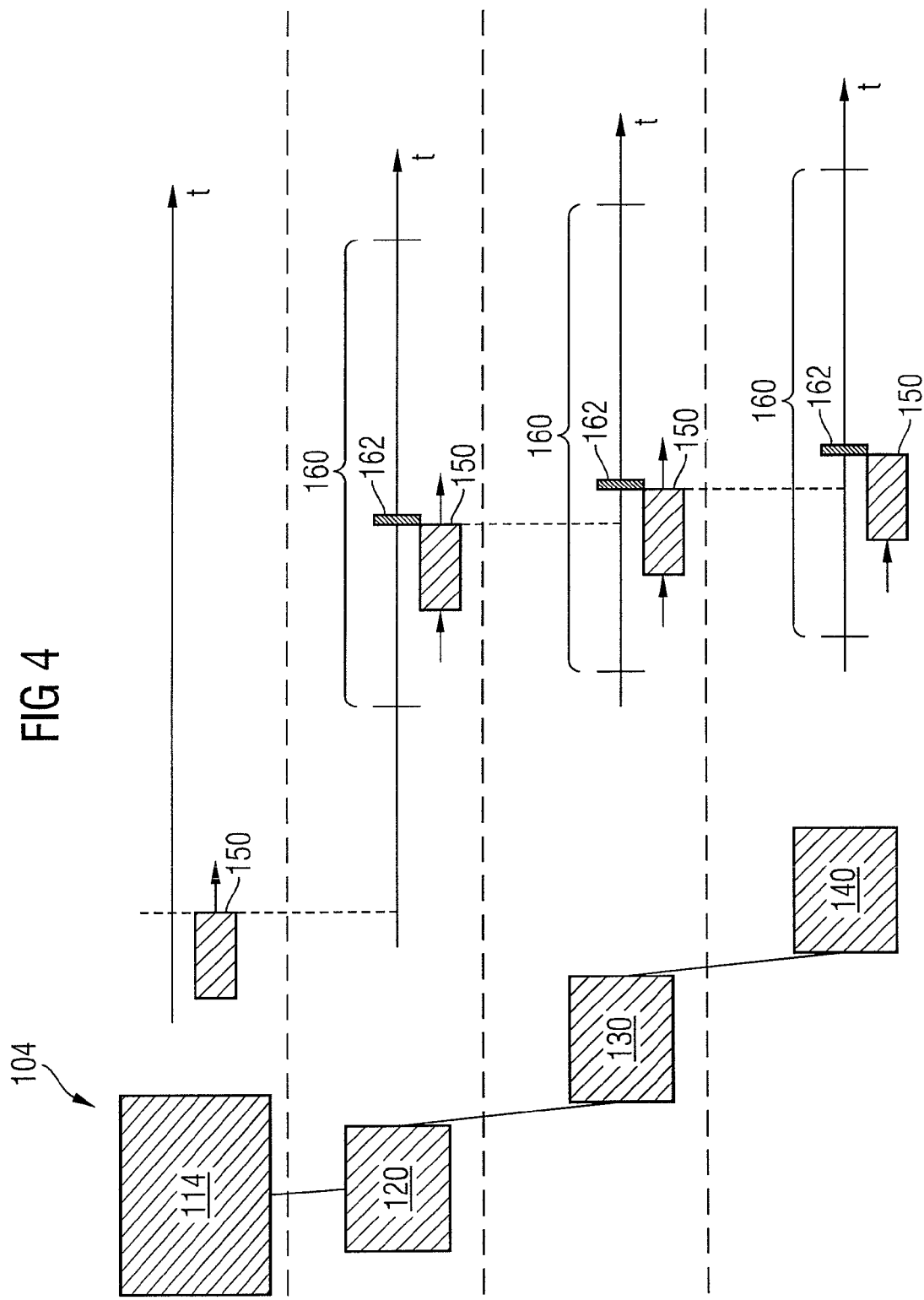
FIG. 4 shows a time plot of a third time scheme for a second embodiment of the controller in accordance with the invention.

FIG. 4 shows a third field bus network 104 which is again slightly modified, the IO controller 112 having been replaced with a third 10 controller 114 in comparison with FIG. 3. This third controller 114 is not configured for real-time communication. Therefore, no transmission time 162 and also no real-time interval 160 are depicted in the time scheme assigned to the third controller 114 in FIG. 4 because they cannot be identified in the third controller 114. When parameterizing the real-time communication, the IO devices 120, 130, 140 can then be informed, for example, that any message arriving at them should be treated as a real-time message. Furthermore, the IO devices 120, 130, 140 can also be informed that messages with a particular identifier arriving at them should be handled as real-time messages. Upon the arrival of a message, the IO devices 120, 130, 140 would then check not only the reception time but also an identifier of the message.

FIG. 4 shows the transmission of the real-time message 150 by the third controller 114 at any desired time outside a real-time transmission interval 160. The first IO device 120 uses, for example, an identifier of the real-time message 150 or a definition predefined when initializing communication, for example, in accordance with the above-described examples, to recognize the message 150 as a real-time message, and buffers the message until the transmission time 162. When the transmission time is reached, the message is processed in the manner explained in the above figures and is forwarded to the second IO device 130. The remainder of the method with the real-time message 150 corresponds to the methods illustrated in FIGS. 1-3.

In this manner, it is even possible to synchronously control a plurality of receivers which each have real-time capability using a controller which does not have real-time capability.

Figure 5:
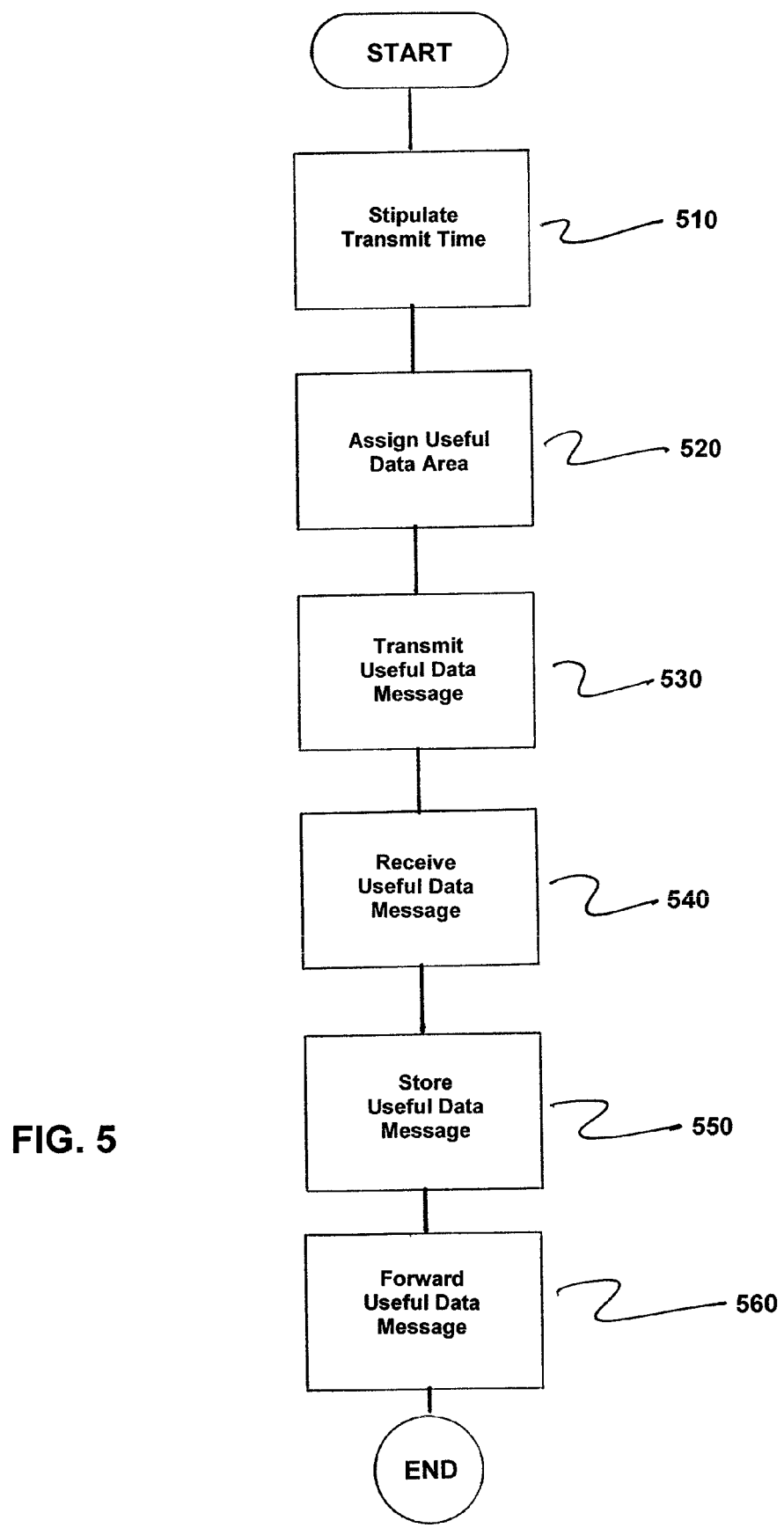
FIG. 5 is a flowchart of the method in accordance with an embodiment of the invention.

FIG. 5 is a flow chart of a method for real-time data transmission in a communication network for transmitting useful data from a transmitter to a plurality of receivers, where the receivers are synchronized in terms of time via a synchronization method. The method comprises stipulating at least one transmission time for transmitting a respective useful data message to the plurality of receivers during real-time data transmission, as indicated in step 510. Each of the plurality of receivers is assigned to a respective receiver useful data area within the respective useful data message such that a respective receiver useful data area is assigned to a respective receiver of the plurality of receivers, as indicated in step 520.

The useful data message is transmitted by the transmitter, as indicated in step 530. The useful data message is received at a first receiver, as indicated in step 540. The received useful data contained in the receiver useful data area assigned to the first receiver is stored at the first receiver for further processing, as indicated in step 550. The received useful data message is forwarded to a second receiver of the plurality of the receivers at the at least one transmission time, as indicated in step 560.

The present invention thus describes a method for real-time transmission from a transmitter to a plurality of receivers, the transmission and synchronization effort when transmitting real-time data within a field bus network being able to be reduced and simplified by combining the information for the different receivers in one message.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for real-time data transmission in a communication network for transmitting useful data from a transmitter to a plurality of receivers, the receivers being synchronized in terms of time via a synchronization method, the method comprising:

stipulating at least one transmission time for transmitting a respective useful data message to the plurality of receivers during real-time data transmission, said at least one transmission time having an accuracy or tolerance period determined by at least one of (i) propagation times of individual receivers and transmitters and (ii) accuracies of the individual receivers and transmitters, and at least one receiver or at least one transmitter, or a plurality of the individual receivers and transmitters, said at least one transmission time being communicated to each of the plurality of receivers in one of an information message or planning message during the real-time data transmission or non-realtime data transmission, said information or planning messages further comprising information relating to receivers of a useful data message or a sequence for forwarding or transmitting the useful data message to the different receivers;

assigning each of the plurality of receivers to a respective receiver useful data area within the respective useful data message such that a respective receiver useful data area is assigned to a respective receiver of the plurality of receivers;

transmitting, by the transmitter, the respective useful data message;

receiving, at a first receiver, the respective useful data message;

storing, at the first receiver, the received useful data contained in the receiver useful data area assigned to the first receiver for further processing; and forwarding the received useful data message to a second receiver of the plurality of the receivers at the at least one transmission time;

wherein the transmitter and the plurality of receivers are synchronized in terms of time; and wherein the transmitter transmits the useful data message within a period of time assigned to the real-time data transmission.

2. The method as claimed in claim 1, wherein each of the plurality of receivers receives the useful data message, stores the useful data contained in the receiver useful data area assigned to each of the plurality of receivers for further processing, and forwards the useful data message to a further receiver of the plurality of receivers if the useful data message is unreceived by any further receivers.

3. The method as claimed in claim 1, wherein at least one receiver of the plurality of receivers compares a time at which the useful data message is received with the at least one transmission time and, based on a comparison result, stores the useful data contained in the receiver useful data area assigned to the at least one receiver for further processing.

4. The method as claimed in claim 1, wherein the first receiver compares a time at which the useful data message is received with the at least one transmission time and, based on a comparison result, stores the useful data contained in the receiver useful data area assigned to first receiver for further processing, and forwards the useful data message to the second receiver of the plurality of receivers at the at least one transmission time.

5. The method as claimed in claim 1, wherein the at least one transmission time includes a plurality of times for transmitting the useful data messages to the plurality of receivers, and data transmission times follow one another at regular intervals of time.

6. The method as claimed in claim 1, further comprising:

transmitting at least one preparation message to the receivers to set up the real-time data transmission, the at least one preparation message comprising at least one of an item of information relating to the at least one transmission time and information relating to at least one of the receiver useful data areas of the respective receiver of the plurality of receivers.

7. The method as claimed in claim 1, wherein the time synchronization is controlled by one receiver of the plurality of receivers.

8. The method as claimed in claim 1, wherein the at least one transmission time is assigned a real-time time range provided for the real-time data transmission, and data communication which is a non-real-time data transmission is performed only outside the real-time range.

9. The method as claimed in claim 1, wherein the communication network comprises a field bus network.

10. A transmitter for a communication network for transmitting useful data to a plurality of receivers, the receivers being synchronized in terms of time via a synchronization method, the transmitter comprising:
 a control device configured and set up to transmit at least one useful data message by:
  stipulating at least one transmission time for transmitting a respective useful data message to the plurality of receivers stipulated during real-time data transmission, said at least one transmission time having an accuracy or tolerance period determined by at least one of (i) propagation times of the control device and (ii) an accuracy of the control device, and the control device or a plurality of control devices, said at least one transmission time being communicated to each of the plurality of receivers in one of an information message or planning message during the realtime data transmission or non-realtime data transmission, said information or planning messages further comprising information relating to receivers of a useful data message or a sequence for forwarding or transmitting the useful data message to the different receivers;
  assigning each of the plurality of receivers to a respective receiver useful data area within the respective useful data message such that a respective receiver useful data area is assigned to a respective receiver of the plurality of receivers; and
  transmitting the useful data message to a first receiver of the plurality of the receivers at the at least one transmission time;
 wherein the transmitter is synchronized in terms of time with the plurality of receivers via the synchronization method; and
 wherein the transmitter transmits the useful data message within a period of time assigned to the real-time data transmission.

11. The transmitter as claimed in claim 10, wherein the transmitter is configured and set up to transmit at least one preparation message to the receivers for the purpose of setting up real-time data transmission, and wherein the at least one preparation message comprises at least one of an item of information relating to the at least one transmission time and information relating to at least one of the receiver useful data areas of the first receiver of the plurality of receivers.

12. The transmitter as claimed in claim 10, wherein the communication network comprises a field bus network.

13. A receiver for a communication network for receiving useful data from a transmitter and for forwarding the useful data to a further receiver, the receiver and further receiver being synchronized in terms of time via a synchronization method, the receiver comprising:
 a control and memory device configured and set up to receive, process and forward at least one useful data message received from the transmitter by:
  assigning a receiver useful data area within a respective useful data message such that a respective receiver useful data area is assigned to the further receiver;
  storing the useful data contained in the receiver useful data area; and
  forwarding the useful data message to the further receiver at at least one transmission time having an accuracy or tolerance period determined by at least one of (i) propagation times of the control and memory device and (ii) an accuracy of the control and memory device, and the control and memory device, or a plurality of control and memory devices, said at least one transmission time being communicated to each of the plurality of receivers in one of an information message or planning message during the real-time data transmission or non-realtime data transmission, said information or planning messages further comprising information relating to receivers of a useful data message or a sequence for forwarding or transmitting the useful data message to the different receivers;
 wherein the control and memory device comprises a time synchronization controller configured and set up to synchronize the receiver with the further receiver in terms of time, or synchronize the receiver and the further receiver with the transmitter in terms of time.

14. The receiver as claimed in claim 13, wherein the control and memory device of the receiver is configured and set up to receive the useful data message from the transmitter, store the assigned useful data contained in the receiver useful data area, and forward the useful data message to a further one of the plurality of receivers at the at least one transmission time.

15. The receiver as claimed in claim 13, wherein the control and memory device of the receiver comprises a comparator for comparing a time at which the receiver receives the useful data message with the at least one transmission time and, based on a comparison result, is configured to store the useful data contained in the receiver useful data area assigned to the receiver.

16. The receiver as claimed in claim 14, wherein the control and memory device of the receiver comprises a comparator for comparing a time at which the receiver receives the useful data message with the at least one transmission time and, based on a comparison result, is configured to store the useful data contained in the receiver useful data area assigned to the receiver.

17. The receiver as claimed in claim 15, wherein the control and memory device of the receiver is configured and set up to forward the useful data message to the further receiver based on the comparison result.

18. The receiver as claimed in claim 13, wherein the communication network comprises a field bus network.

* * * * *